FIG. 2a

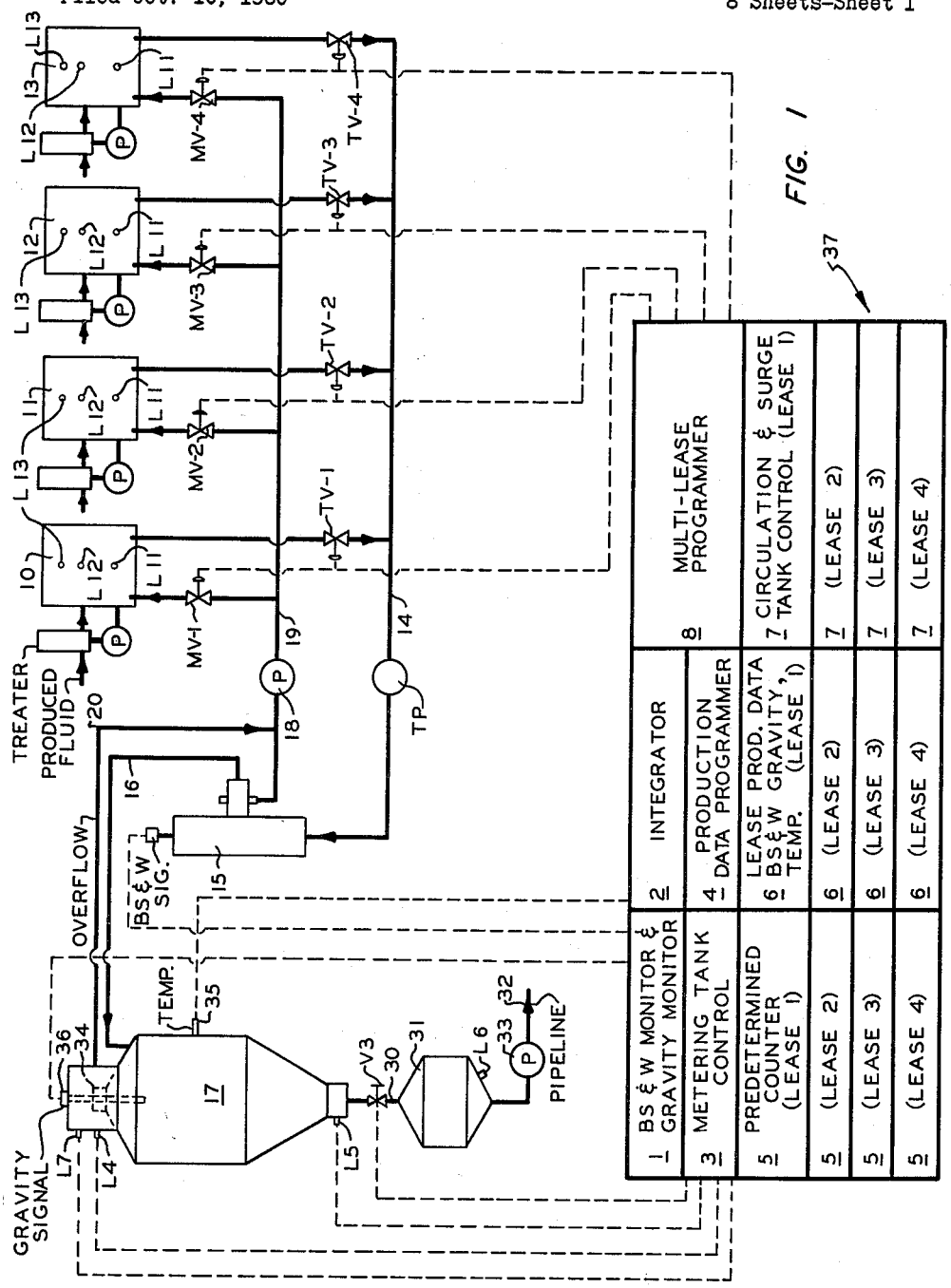

INVENTOR.
L. E. KUNTZ

Oct. 22, 1963 L. E. KUNTZ 3,107,526
LEASE AUTOMATIC CUSTODY TRANSFER
Filed Oct. 10, 1960 8 Sheets-Sheet 4

INVENTOR.
L.E. KUNTZ
BY
ATTORNEYS

INVENTOR.
L.E. KUNTZ

ATTORNEYS

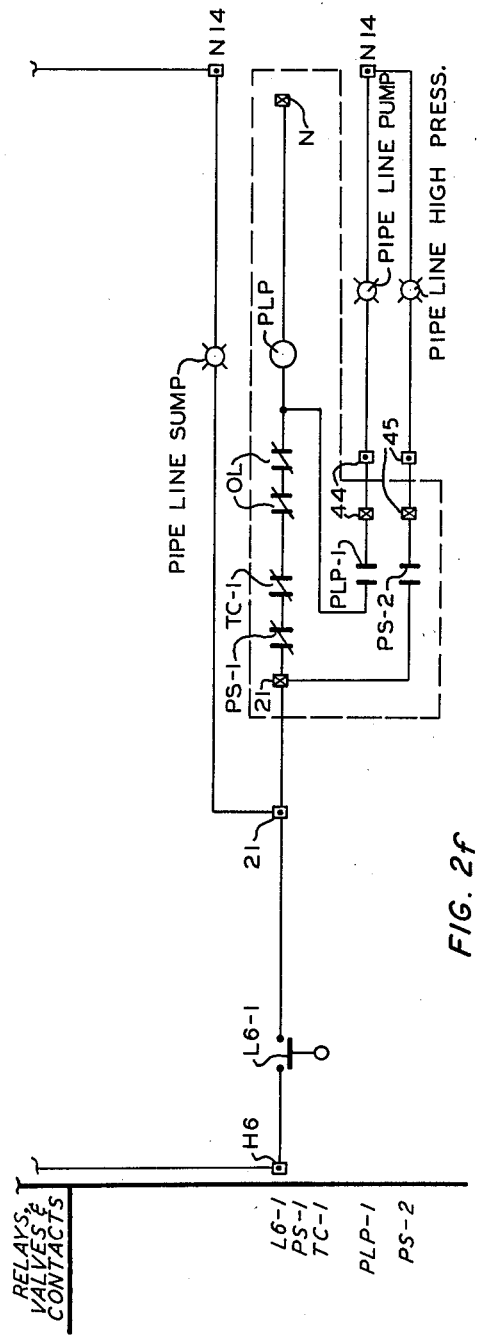

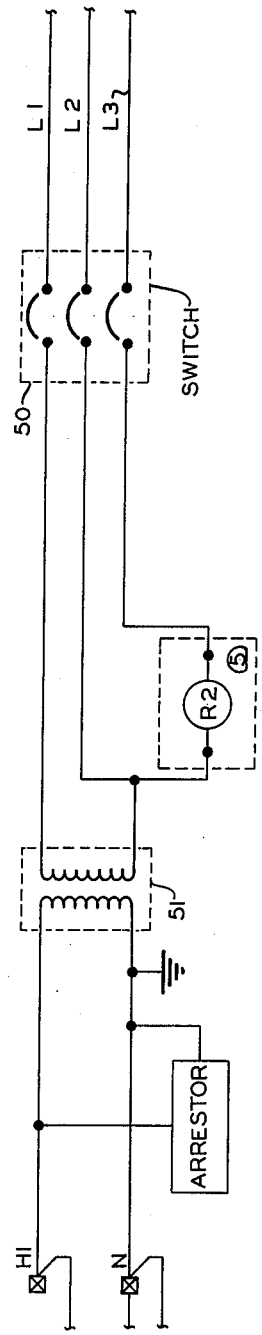

United States Patent Office 3,107,526
Patented Oct. 22, 1963

3,107,526
LEASE AUTOMATIC CUSTODY TRANSFER
Louis E. Kuntz, Bartlesville, Okla., assignor to Phillips
Petroleum Company, a corporation of Delaware
Filed Oct. 10, 1960, Ser. No. 61,691
11 Claims. (Cl. 73—195)

This invention relates to oil field lease automatic custody transfer apparatus and method. In one aspect it relates to multi-lease transfer utilizing a single automatic custody unit. In another aspect it relates to automatic custody transfer data read out.

Although in recent years many improvements have been made for handling oil field production from the time it issues from the well until it is discharged into a pipeline, resulting in automatic measurement of the volume of transferred fluid and transfer of custody to the pipeline, manual attention has been required to measure properties of stored samples, for example, gravity, temperature and BS & W.

In the production of oil field fluids from separate leases, the production from each lease must be measured and accounted for individually even though production from a group of leases in a particular area is transferred to a single pipeline and comingled therein. Heretofore for automatic lease operation, it has been necessary to provide separate lease automatic custody transfer apparatus for each lease. In some instances, this has prohibited the use of such automatic custody transfer installations as the cost of the installations becomes relatively high where leases are small and production is low.

An object of this invention is to provide a more economical multilease automatic custody transfer system.

Another object of this invention is to provide an automatic custody transfer system in which data relating to properties of the transferred fluid are determined automatically and the data recorded in a form suitable for use by persons not experienced in data calculation from instrument records.

Another object of this invention is to provide an improved production data read out system for lease automatic custody transfer.

Other aspects, objects and advantages of the invention are apparent from the specification, the drawing and the claims.

According to my invention, a single lease automatic custody transfer system is utilized for a plurality of leases by providing automatic means to connect the various leases to the single transfer system as required to transfer the production from these leases to a pipeline. Comingling of lease production prior to transfer to the pipeline is prevented by installing a separate surge tank and circulating pump for each lease. A header is provided with automatic valves connecting each separate surge tank outlet to a single transfer pump suction. Separate circulating pumps are connected with each surge tank and the respective treaters, and a header is provided with automatic valves directing discharge from a BS & W monitoring pump back to the surge tank. A multi-lease programmer interlocks the various automatic valves and production data read out equipment to transfer production from each lease as required and to register the production and measure properties of the fluid for a particular lease on the proper counters in a production data panel.

My invention also provides improved data read out utilizing a single integrator to convert signals representing a plurality of measured properties of a metered fluid and providing means to direct signals from the integrator to the recorder representing the particular measured property, and, in the case of multi-lease operation, to a recorder representing also the lease from which production is being transferred at the time.

Further according to my invention, I have provided improved automatic determination of BS & W content of a metered stream by providing for full flow of the entire metered stream through a BS & W detector thus providing for analysis of the entire stream during the exact time of transfer. This makes possible a much more accurate determination of an average BS & W content than can be obtained normally from a small sample from a large quantity either by manual or automatic means. Further a single BS & W unit determines BS & W content of production from a plurality of leases.

Various monitor and interlock features are provided to take care of abnormal conditions. For example, if a higher than permitted BS & W value is detected within a predetermined time after the system steps to a new lease position, the circulating pump for that lease starts and runs for a time which is preset on an automatic timer, the transfer pump is not permitted to start and the programmer steps to a new position where the sequence repeats. If a high BS & W value is detected while the metering operation is proceeding, the transfer pump stops, the circulating pump for that lease starts and the programmer remains in position. After the oil cleans up, the meter tank again begins to fill and the cycle continues. If a high BS & W value is detected while the meter tank is dumping and persists at the time the meter tank empties, the programmer steps to a new position even though the previous surge tank is not at its normal low level. The circulating pump on the previous lease runs for a preset time and stops automatically.

If the leases are in an area where allowables are set, the individual allowable can be determined in terms of numbers of meter tank dumps for each lease and can be preset on individual predetermined counters. On completion of the predetermined number of dumps, the programmer steps to a new position regardless of the level in the surge tank and this lease is by-passed by the programmer until the predetermined counter is manually reset.

Various other novel control and interlock features are included and will be described in more detail below.

In the drawing, FIGURE 1 is a simplified schematic diagram of a four-lease automatic custody transfer system.

FIGURE 3 is a schematic circuit diagram of a suitable power supply system.

Figure 2A:
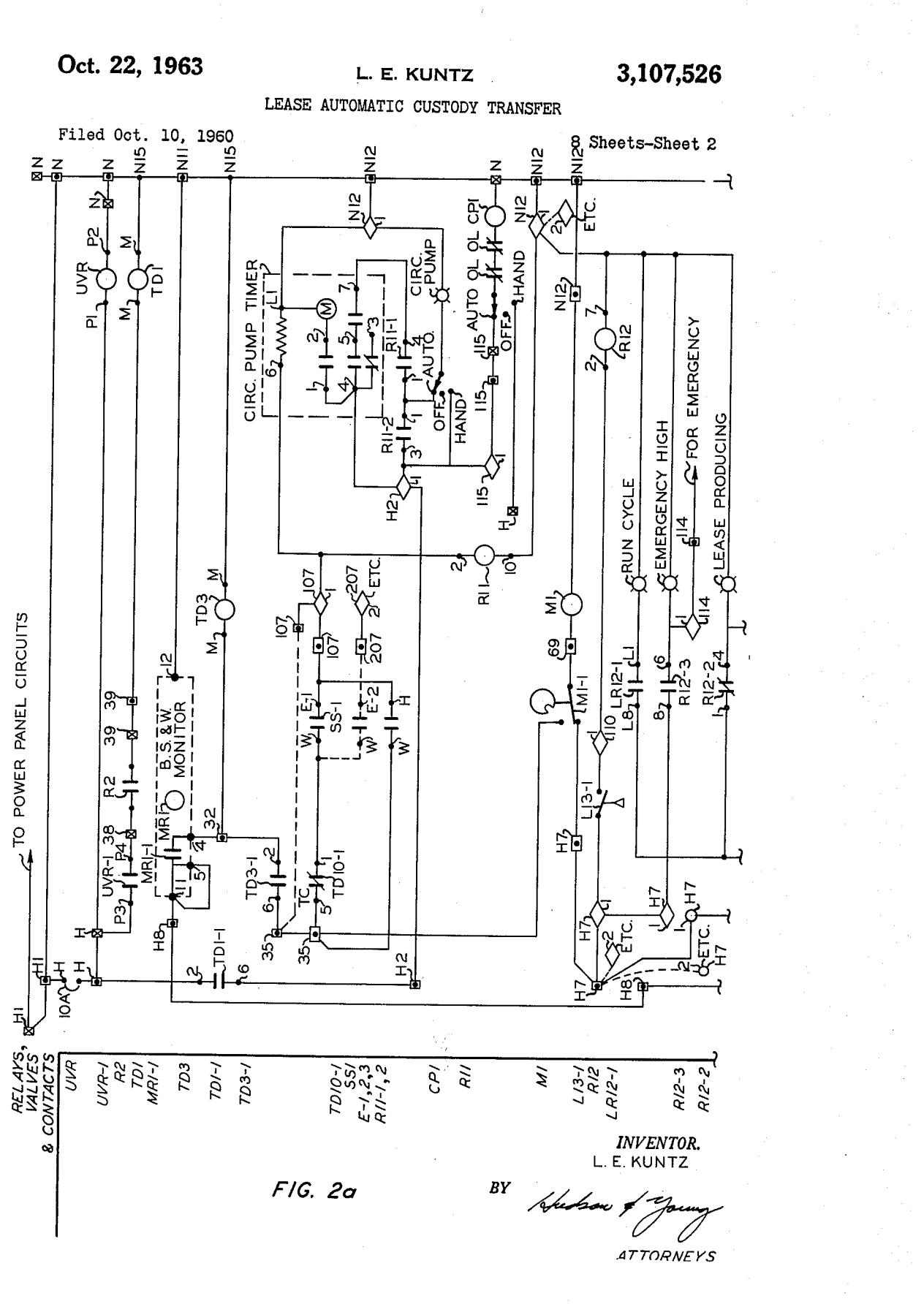

FIGURE 2 is divided into several portions, 2a through 2f, which taken together constitute the complete circuit diagram.

Figure 2B:
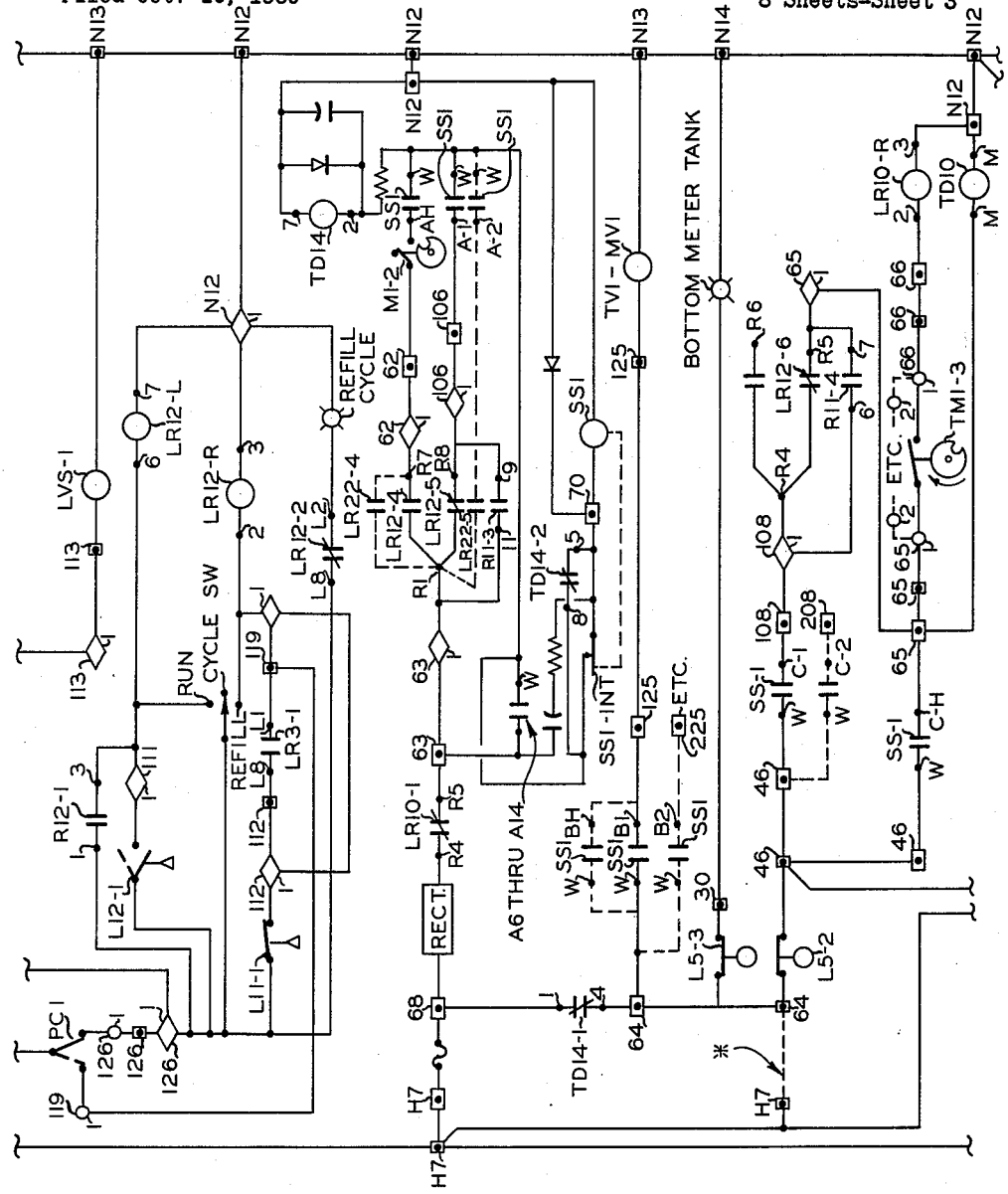
FIGURE 2 is a schematic circuit digram of a complete multi-lease control system, including in some detail the operating circuits for one lease and indicating circuits which are duplicated for additional leases.

In FIGURE 1, there are illustrated four surge tanks 10, 11, 12, and 13, one for each of four leases. There may, of course, be a larger or smaller number of leases connected with the system and a corresponding number of surge tanks. Each surge tank is provided with level detector floats L11, L12 and L13. Associated with each surge tank are a treater, and a circulation pump as shown and produced fluid from each lease flows through the corresponding treater on the way to the surge tank. Each treater also may be used to further treat oil from the surge tank as required when the BS & W content exceeds a predetermined maximum. Surge tanks 10, 11, 12, and 13 are connected to a transfer line 14 through valves TV-1, TV-2, TV-3 and TV-4 and to monitor line 19 through valves MV-1, MV-2, MV-3 and MV-4 respectively. Transfer pump TP is provided in transfer line 14 which connects with BS & W detector 15, the outlet of which connects through line 16 with metering tank 17 and through montior line 19 with the various surge tanks. A monitor pump 18 is provided in monitor line 19.

Metering tank 17 is connected by overflow 29 with monitor line 19, and by discharge line 30 with pipeline sump 31 which is connected with pipeline 32 in which is provided pump 33. Run valve V-3 is provided in line 30.

Metering tank 17 is further provided with an overflow weir 34, with temperature measuring probe 35, gravity detector 36 and with detector floats L4, L5, and L7. A similar detector float L6 is provided in sump 31.

Control unit 37 comprises several module units, BS & W and gravity monitor 1, integrator 2, metering tank control 3, data programmer 4, predetermined counter 5, lease production data unit 6, circulation and surge tank control 7 and multi-lease programmer 8. For each lease in excess of one, an additional set of units 5, 6 and 7 are provided. Control lines for valves TV-1, TV-2, TV-3 and TV-4 and valves MV-1, MV-2, MV-3 and MV4 are connected with programmer 8. Temperature probe 35 is connected with integrator 2, the BS & W detector 15 and gravity cell 36 with monitor 1 and detector floats L4 and L5 and valve V3 with control 3.

Gravity detector 36 comprises a float actuated variable capacitance device and a suitable unit for this service is described in copending application Serial No. 845,118, filed October 8, 1959, now abandoned. The various level controls indicated on the surge tank can be, for example, manometer level control shown in U.S. Patent 2,949,126. Various types of float operated switches or other types of level detector probes may be used for elements L4, L5 and L6. Suitably probe 35 is a resistance type temperature sensing element. BS & W detector cell 25 is shown in my copending application Serial No. 686,192, filed September 25, 1957, FIGURE 3, now Patent No. 3,005,554.

Module 1 contains the circuits for the BS & W monitor and gravity monitor. The BS & W monitor continuously monitors oil in a preselected surge tank and monitors the total transferred stream when the meter tank is filling. An adjustable upper limit stops transfer and starts the circulating pump when bad oil occurs. A commercial monitor "Dielectric Monitor Model T.D.M." sold by United Engineers, 824 East Sixth Street, Tulsa, Oklahoma, is used with both the BS & W and gravity detectors. These units utilize electronic circuits for converting a capacitance detector signal to a current which is measured and indicated as described below.

Module 2 includes the temperature transducer which continuously monitors the temperature at the mid-point of metering tank 17. This module also includes the integrator (averager) which converts the detected temperature signal into a voltage and the voltage into a pulsed signal which may be recorded on a counter. An integrator which may be used in this module is described on page 42 and page 43 in the January 23, 1959, Electronics magazine. This integrator is used not only to integrate the temperature signal but also the BS & W and gravity signals. The pulsed output which is counted is proportional to the input variable. For example, the BS & W monitor output for 0–1 percent BS & W may be converted to 0–100 pulses per minute and the temperature monitor output for 20–120° F. may be converted to 20–120 pulses per minute.

Metering tank control module 3 contains pilot lights associated with name plates representing meter tank level controls, run valve, sump level control, pipeline pump, etc. Module 3 also contains circuits which are actuated by the various level detectors on metering tank 17 and the various surge tanks. These circuits control the operation of the various valves and pumps to meter the oil from the surge tanks through metering tank 17 to the pipeline.

Production data programmer module 4 connects the BS & W monitor with the integrator of module 2 while the meter tank is filling so that the pulses proportional to the percent BS & W are fed into the BS & W counter of module 6. Each time the tank fills to the weir level this programmer goes through a read out cycle as follows: The temperature transducer output is connected to the integrator in module 2 and the pulses "gated" into the temperature counter of module 6 for one minute. This results in one pulse being counted for each degree Fahrenheit for the oil temperature. The gravity measuring device is connected to the integrator and the pulses from the integrator are fed into the gravity counter of module 6 for one minute. Upon completion of these read outs, the run valve is opened by the programmer. This module is an important feature of my invention.

Module 5 contains the predetermined counter which is a double deck counter, one deck of which registers the number of cycles of operation of metering tank 17 and is not resettable. The other deck is resettable and can be set at a predetermined number of cycles so that an electrical contact operates when this number is reached. Thus, the number of cycles corresponding to each lease allowable can be set into the counter and the lease shut in when the count is completed. This counter along with the temperature recorder serves as a check on the data read out system which also contains a dump counter on the lease production data panel of module 6.

Module 6 includes the production data panel. Data required for writing a run ticket are stored on the numerical registers mounted on this panel. Suitable recorders can be used to give a record of the meter tank temperature and gravity if desired. Data stored on the counters are as follows: BS & W count, time count, temperature count, dump count, and gravity count. The total gross volume equals the dump count times a tank calibration factor. The average percent BS & W equals the BS & W count divided by the time count, while the average temperature and gravity, respectively, are determined by dividing the temperature count and gravity count by the dump count.

The counters for temperature and BS & W comprise mechanical counting units actuated by electrical pulses. For gravity, an add and subtract unit is required, and a suitable device is model 5-1-8602-MF of the Durant Manufacturing Company. The dump counter is one which indicates one additional unit for each revolution of a shaft. Any suitable elapsed time recorder may be used as the time counter.

Circulation pump and surge tank control module 7 includes an adjustable timer which controls the length of time a circulating pump will continue to run after it has been started by the BS & W monitor. Pilot lights on this panel indicate "transfer cycle," "refill cycle," "emergency high" and "lease producing" and other functions of the automatic custody transfer operation not indicated on the meter tank control panel.

Multi-lease programmer module 8 is used when two or more leases are connected to a single automatic custody transfer unit and in addition a set of modules 5, 6 and 7 are added. Each lease has a treater, surge tank and circulating pump, the other facilities being time shared. Module 8 contains a stepping switch which is actuated by the surge tank level controls. This switch connects the proper lease production data panel to the production data programmer module 4 when a particular surge tank is connected to the transfer pump. Module 8 is a particular feature of my invention.

Figure 2C:
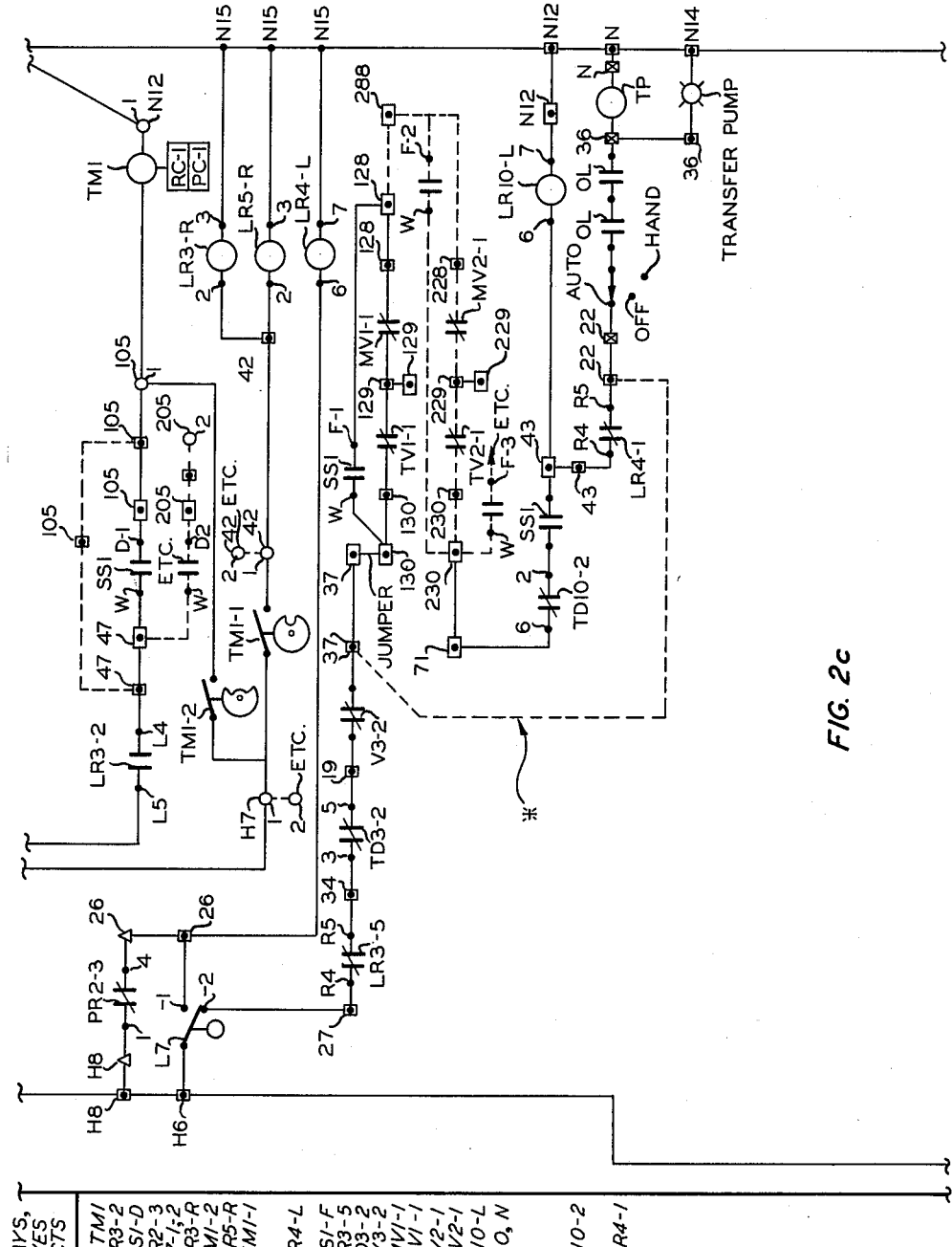
Figure 2D:
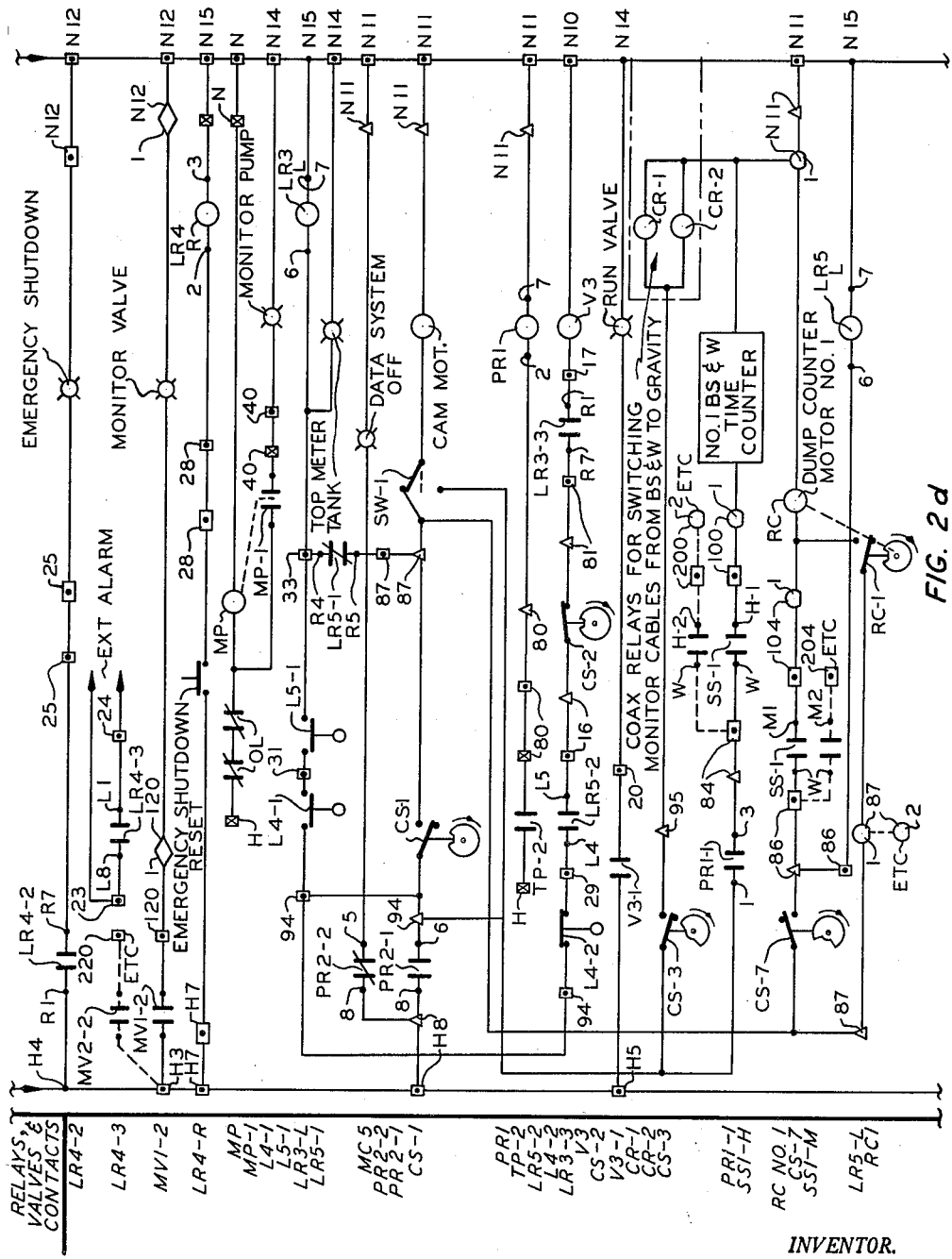
Figure 2E:
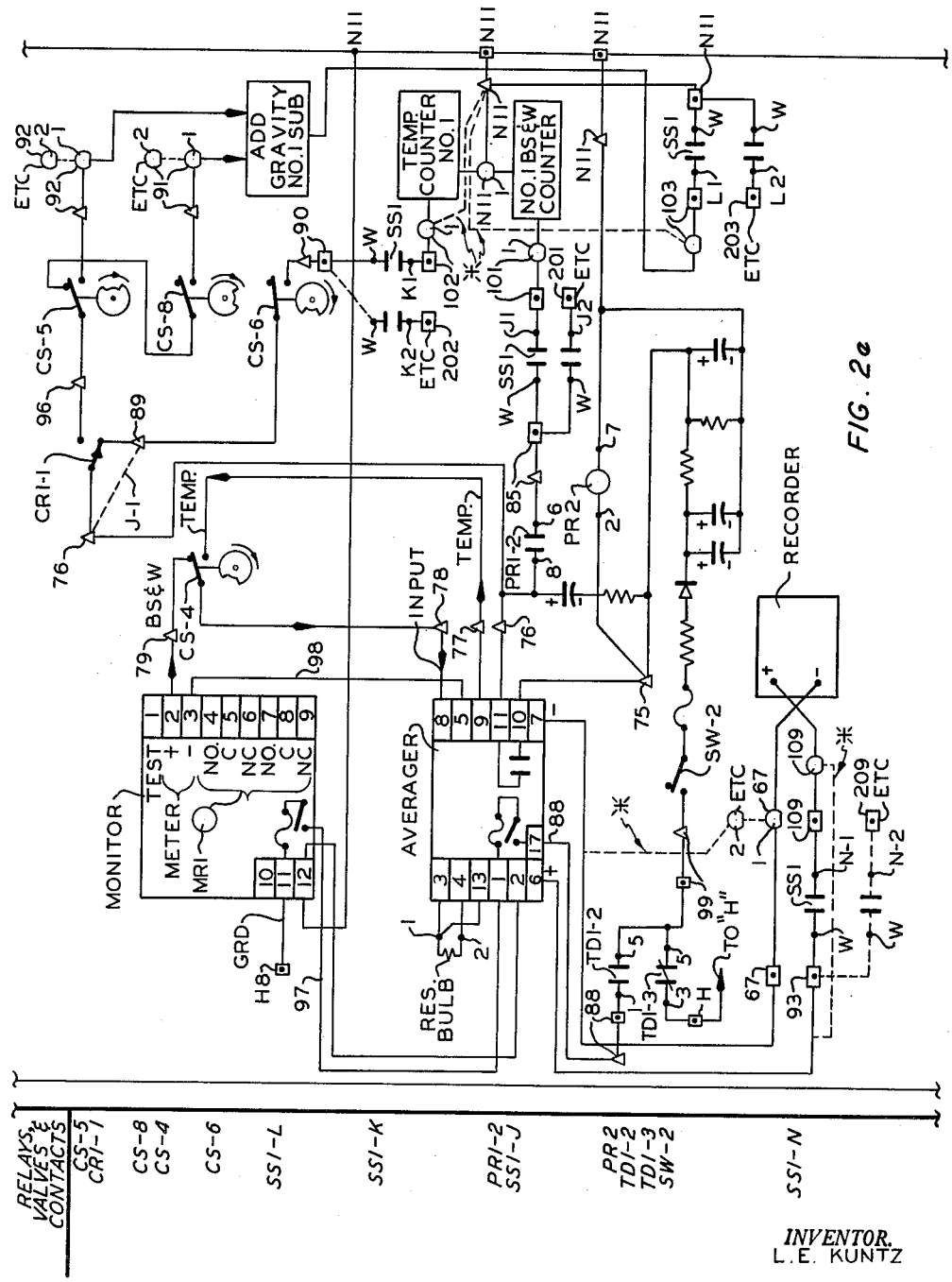

The circuits of all of modules 1 through 8 are combined in the circuit diagram of FIGURE 2. The various modules are not separated into individual units in this diagram but rather are combined in a manner to eliminate the necessity for a large number of separate figures and sheets of drawing and to simplify the description of the operation of my system. So that FIGURE 2 may be correlated with the various module functions, the terminals of each module are shown by symbols in accordance with a legend on the drawing.

Referring now to FIGURES 2 and 3, to begin the description of a normal cycle, it is assumed that all surge tanks are empty, the control system deenergized, all valves closed and the meter tank empty. All toggle and hand operated switches are in the position shown in the drawing. All relays are shown in the deenergized position or in the unlatched position for all latch-type relays. Stepping switch SS1 is at home position.

*Placing System in Operation*

Closing master switch 50 in FIGURE 3 energizes the primary of a transformer 51 which is connected across lines L1 and L2 of a three-phase alternating current supply. The coil of relay R2, connected across lines L2 and L3, also is energized and monitor pump 18 is started. This relay protects the various motors from single phase operation by opening the circuit to TD1 time delay relay which deenergizes the control circuits thereby stopping all motors since the motor starters are operated from the control circuit following TD1–1 contact. If either of lines L1 or L2 is open, the control circuit will be inoperative since power will not be supplied to transformer 51 which feeds the control circuits.

*Energizing Control Circuits*

Closing the master control switch 10A in FIGURE 2 supplies power to terminal H and to undervoltage relay UVR. This relay closes contact UVR–1 and, since contact R2 has previously been closed, voltage is applied to the coil of TD1 which, after a time delay, supplies voltage to the remainder of the control circuits. TD1–3 supplies power to the D.C. counter supply from H during the time delay of TD1, after which the normal power source, terminal 17 of the integrator 2, is connected through contact TD1–2. The connection is made through TD1–2 to place this circuit in series with power switches and fuses in other units to stop the transfer operation when they are not all energized. At the time power is supplied to terminal H, PR–2 picks up to prepare the programmer and transfer pump circuits for manual operation.

Time delay relay TD3 is actuated by BS & W monitor 1 and is deenergized when the water content of the metered fluid is within the allowable limit. The delay of this relay prevents operation of the system to discontinue metering and begin oil recirculation when transient drops of water cause momentarily high water content readings. Therefore, in normal operations, TD3 is deenergized.

*Filling Surge Tanks*

When lease production has flowed through a treater to the corresponding surge tank for sufficient time, the corresponding level control L11 is covered, thus opening contact L11–1 and deenergizing LR12R which at this time has no effect, but which permits LR12 to be latched at a later time in the cycle. This occurs when the oil in the surge tank reaches the normal high level control L12, at which time transfer of oil to the meter tank begins.

*Selecting Lease*

The multi-lease programmer which is of particular importance in the selection of a lease from which to run oil as well as in the selection of proper data information recorders is illustrated as a part of the circuit of FIGURE 2. When level control L12 is covered with oil, L12–1 closes, thus latching LR12, closing LR12–1 and LR12–4 and opening LR12–5 and LR12–6. LR12–1 completes a circuit to a run cycle light while LR12–2 opens a circuit to the refill cycle light. A circuit is completed to the coil of stepping switch SS1 from the rectifier through LR10, LR12–4, M1–2, SS1–AH, and SS1–INT. Stepping switch SS1 performs the switching operation to select a particular lease. The voltage builds up rapidly across the coil TD14 and after a fraction of a second, TD14 energizes thus opening TD14–1 to remove power from the SS1 control contacts and TD14–2 opens to deenergize SS1 coil permitting SS1 to step to position No. 1, SS1 being the type of stepping switch which is cocked by an application of power and stepped when the coil is deenergized. After another short period, TD14 drops out causing TD14–1 to close thus restoring power to SS1 power contacts and also closing TD14–2 which, however, have no effect since contact LR12–5 is open. Thus, SS1 is stopped at lease position No. 1, and the system is preparing to transfer oil from surge tank No. 1.

The purpose of TD14 and contact TD14–1 is to remove control voltage from the stepping switch contacts during stepping SS1 while contact TD14–2, due to the time delay of TD14, slows the operation of SS1 which would be very rapid if left only to the control of SS1–INT, the built in stepping switch interrupter, and breaks the arc which would otherwise be detrimental to the interrupter contact.

When contact LR12–6 opens, TD10 is allowed to time out thus giving time for the BS & W capacitance cell to be purged by oil from the selected surge tank and be monitored for a short time before acceptance. Contact TD10–1 prevents bad oil relay R11 from picking up until TD10 times out. TD10–2 during this period prevents transfer of oil by preventing operation of transfer pump TP.

*Preparing to Transfer Production From Surge Tank*

With SS1 in No. 1 position and prevented from further stepping from this position by the fact that LR12–5 is open, the following events take place simultaneously:

SS1, A–1 closes____ No effect (LR12–5 open).
SS1, B–1 closes____ Transfer and monitor valves TV1 and MV1 energized for lease No. 1.
SS1, C–1 closes____ No effect (LR12–6 open).
SS1, D–1 closes____ No effect (LR3–2 open).
SS1, E–1 closes____ No effect (TD3–1 and TD10–1 still open.
SS1, F–1 closes____ Shorts across TV1–1 and MV1–1 interlocks.
SS1, H–1 closes____ No effect but prepares circuit to No. 1 BS & W time counter.
SS1, J–1 closes____ No effect but prepares circuit to No. 1 BS & W pulse counter.
SS1, K–1 closes____ No effect but prepares circuit to No. 1 temperature counter.
SS1, L–1 closes____ No effect but prepares circuit to No. 1 gravity add-subtract counter.
SS1, M–1 closes____ No effect but prepares circuit to No. 1 dump counter.
SS1, N–1 closes____ Temperature recorder for lease No. 1 immediately operates from output of averager.

It is noted that TV1–1, MV1–1, and TV2–1 and MV2–1 are in series with the transfer pump starter. These contacts are actuated by the transfer valves and monitor valves of the various lease surge tanks and thus the transfer pump is prevented from operating when any valves other than valves of the tank from which production is desired are open, the particular pair of contacts for the tank from which production is desired, being shorted by the operation of SS1, F–1, F–2, etc.

At this time the SS1 home position contacts all open with the following results:

SS1, A–H opens____ Deenergizes TD14 and keeps any other lease from giving SS1 self oil signal.
SS1, B–H opens____ Deenergizes transfer and monitor valves of lease monitored at home. In case it were lease No. 1 there would be no change and the valves would remain energized.
SS1, C–H opens____ Deenergizes TD10 allowing it to time out.
SS1, E–H opens____ No effect except lease monitored at home cannot now have oil recirculated for clean-up.

With TD10 timed out, TD10–1 closes which has no effect unless oil has too high BS & W content, in which case TD3–1 is closed and circulating pump timer CP1 will be set. TD10–2 closes to start the transfer pump provided all other fail safe conditions are met and oil is clean. LR10 latches and LR10–1 opens and D.C. voltage to SS1 coil is made unavailable.

*Transferring Production from Surge Tank*

Transfer pump TP starts from contact TD10–2, and TP–2 closes, energizes relay PR1 on data programmer; PR1–1 closes starting No. 1 BS & W time counter and PR1-2 closes allowing pulses from the averager to be registered on No. 1 BS & W counter.

The BS & W counter is actuated by pulses from the averager during the entire period that the meter tank is filling and during this time the BS & W time counter also is operative so that, for each fill of the meter tank, there will be reported a number of pulses which, divided by the time for each filling, also recorded, indicates the average BS & W content for that filling cycle.

When meter tank 17 is filled and oil overflows weir 34, detector float L4 is covered and L4–1 closes; LR3 latches and top meter tank pilot lights; LR3–2 closes to prepare the circuit to TM1 predetermined dump counter; LR3–3 closes preparing the circuit to run valve V3; and LR3–5 opens stopping transfer pump TP. TP–2 opens deenergizing PR1 to open PR1–1 and stop the BS & W time counter. PR1–2 opens stopping pulses to the BS & W counter.

*Data Read Out*

The elements of the data programmer module are included and illustrated in FIGURE 2. By referring to this figure, the operation of this module can be understood, both in relation to its function as a unit element and in relation to the overall operation of the automatic custody transfer system.

When L4–1 closes the data programmer motor becomes energized through LR5–1 and SW–1. L4–1 opens after the oil drains back through line 20 from the weir 34 of tank 17 shortly after the transfer pump stops. After the programmer starts running the following sequence takes place: CS–1 closes to seal in the programmer motor power from hot line 94 through PR2–1 and CS–2 opens to prevent operation of run valve V3 until the programmer has completed the gravity add read out cycle. Following this, CS–4 closes to switch the averager (integrator) from BS & W to temperature operation and CS–7 closes, dump counter motor 1 starts and RC1 locks in this motor. LR5 latches, opening LR5–1 removing power from LR3L and top meter tank pilot light. This provides a fail safe operation if L4–1 stays wet. LR5–2 closes, allowing run valve V3 to be energized when CS–2 recloses. CS–6 then closes and starts the gating of temperature pulses to temperature counter No. 1. CS–7 then opens which has no immediate effect but removes power from LR5–L. After the desired preset time for recording temperature pulses has elapsed CS–6 opens and discontinues the recording of these pulses. CS–3 then closes to energize coax relays CR1 and CR2 and switch coax cables from module 1 from the BS & W cell 15 to gravity probe 36. CR1–1 switches to gravity cams CS–5 and CS–8. CS–8 closes, feeding pulses from the averager to gravity No. 1 add, and, after the desired time, opens to stop these pulses. CS–2 closes, energizing run valve V3 and starting a meter tank dump cycle. V3–1 closes, lighting a run valve pilot and V3–2 opens to maintain the transfer pump circuit open. After the desired time interval, CS–5 then closes, feeding pulses to the gravity subtract counter No. 1 and opens to stop these pulses. CS–3 then opens to drop out coax relays and CS–1 opens to stop the programmer.

The data programmer thus prevents operation of run valve V3 until all the appropriate data have been recorded by the sequence of operations controlled by this module. As was explained earlier, the BS & W detector is connetced to the integrator of module 2 continuously during the time meter tank 17 is being filled, and thus, in combination with a simultaneous time recorder, supplies data from which an average BS & W content can be determined. When meter tank 17 has filled, the data programmer disconnects the BS & W cell from the integrator and connects the temperature probe. The programmer further permits pulses which are thus generated proportional to the temperature of the oil in the meter tank to be recorded for a definite predetermined period of time. For example, if the number of pulses per minute is directly proportional to temperature degrees Fahrenheit, the temperature probe can be permitted to actuate the integrator for one minute, in which case the temperature recorded for that particular run will be a number of pulses equal to the degrees Fahrenheit. This recorded number, after a number of runs have been made, can be divided by the number of runs to give the average temperature per run. Following the temperature recording step, the programmer connects the gravity cell to the integrator and permits pulses to be recorded for a predetermined time interval. At the conclusion of the run, another cycle of gravity recording is provided by the programmer. This later period records the gravity instrument in its inactive or home position. Since it is desired that the gravity indication be a function of API gravity which varies inversely with the density of the liquid, and since the home position of the gravity measuring probe float is lower that is, corresponds with a lower density measurement, the gravity pulses from the first mentioned reading are added while the pulses recorded with the instrument in its inactive position are subtracted. Since it is the difference of the two readings which is recorded and converted to a gravity reading, instrumentation drift due to temperature or other causes is substantially eliminated. Prior to recording the gravity signals, the programmer also switches coax relays to disconnect the BS & W detector from Monitor 1 and to connect the gravity probe. Following the initial gravity reading, the programmer permits the meter tank to dump following which the second gravity reading is made, the coax relays are returned to their original position and the programmer stops.

*Transferring to Pipeline*

Closure of CS–2 in the previous sequence step energizes run valve V3 and starts the drain down of the meter tank. L4 float becomes dry shortly after the transfer pump stops. As the meter tank empties, L5 becomes dry, and L5–2 closes, starting predetermined dump counter motor number TM1 running. The counter will record one dump for one revolution and rotate 3 cams through one revolution as follows: TM1–2 closes to seal in motor TM1 of the dump counter; TM1–3 closes momentarily which has no effect until after a surge tank has reached bottom level as described below. TM1–1 closes momentarily and unlatches LR3 and LR5. LR3–2 opens to prepare to stop TM1 at end of one revolution, LR3–3 and LR5–2 open to deenergize run valve V3 which recloses and LR3–5 closes to start transfer pump TP for a second meter tank fill. L5–3 opens to turn off bottom meter tank pilot light following which TM1–2 opens stopping motor TM1. After the run valve is opened as described above, pipeline sump 31 starts to fill with oil and L6 becomes wet, L6–1 closes starting the pipeline pump and lighting a pipeline sump pilot and PLP–1 closes lighting a pipeline pump pilot. PS2–2 closes if pipeline pressure is high to light a warning pilot and PS2–1 opens to stop the pump motor. Meter tank fill sequence will repeat for second and subsequent meter tank dumps in the same order as described above until the surge tank has reached the bottom level.

*Operation When Surge Tank Empties*

When the level in surge tank 1 reaches lower detector float L–11, L11–1 closes, thus completing a circuit through LR12–R to release LR–12 and the following events occur simultaneously:

LR12–1 opens_____ Extinguishes run cycle pilot light.
LR12–2 closes_____ Lights refill cycle pilot.
LR12–4 opens_____ Prepares to stop SS1 at home if no other lease is calling to sell oil.
LR12–5 closes_____ Prepares circuit to step SS1 off lease No. 1.
LR12–6 closes_____Prepares circuit to unlatch LR10 and pickup TD10 in preparation for new time out.

Following this operation when the meter tank finishes emptying and L5 again becomes dry, L5–2 closes and starts predetermined dump counter motor TM1. TM1–2 closes, sealing in motor TM1 of dump counter, following which TM1–3 closes momentarily; LR10 unlatches; LR10–1 closes; SS1 cocks and the same sequence is followed in advancing SS1 in conjunction with TD14 as described above, except SS1 will step from one lease position to the next until an open (—5) latch contact is found. If none is found, the switch returns to home.

TM1–1 closes momentarily thus actuating LR3–R and LR5–R to release LR3 and LR5, respectively. LR3–2 opens to prevent operation of TM2 or other TM if SS1 stops on another lease. SS1 D–1 as well as LR3–2 is open to stop TM1 after one revolution. LR3–3 opens to deenergize run valve V3 and LR3–5 closes but the transfer pump is not started since SS1 in the home position provides an open circuit. However, if SS1 has found a lease circuit calling for delivery of oil, the procedure will repeat from that lease in accordance with the steps outlined above. It should be noted that TD10 has been energized when LR12–6 was closed and, if the stepping switch SS1 has stopped in the home position, this relay remains energized thus additionally preventing the operation of the transfer pump by means of open contact TD10–2. TD10–1 also is open to prevent the operation of the circulating pump. However, in the home position, a jumper is provided for contact TD10–1 to permit circulation of oil from one lease while the system is in the home position.

*Abnormal Conditions*

If a low voltage condition occurs, undervoltage relay UVR is deenergized thus opening contact UVR–1 and deenergizing TD1 to open contact TD1–1 which deenergizes the entire control circuit and stops the transfer of oil. TD1–2 opens and TD1–3 closes thus transferring power to the D.C. power supply from terminal 88 to H. Thus when the A.C. power supply returns to normal and TD1 begins to time out, the D.C. supply will already be operating to pick up relay PR2, releasing contacts PR2–3 to remove LR4–1 from the lines. This prevents latching of LR4 after a power failure and power return, the D.C. relay PR2 in the data programmer otherwise not being energized in time to prevent latching of LR4. The use of PR2 provides a fail safe operation in that, if for any reason the power is broken to the monitor, integrator, or programmer D.C. supply due to, for example, an open switch, a blown fuse, or a broken wire, relay PR2 is deenergized thus opening PR2–1 to remove power from the programmer circuits. PR2–2 closes to light a data system off pilot and PR2–3 closes thus latching LR4. When this occurs, LR4–1 opens to prevent operation of the transfer pump, LR4–2 closes to light an emergency shutdown pilot, and LR4–3 closes for emergency signals or additional fail safe operations as needed. After the cause of the shutdown has been found, it is necessary to press the emergency shutdown reset button to unlatch LR4 and put the control system back in normal operation.

TD1 relay provides enough delay to prevent the application of power to the control circuits until the power has become stabilized.

If meter tank 17 has filled and upper detector float L4 is covered but because of some failure the proper action is not taken to stop the transfer pump, the meter tank continues to fill until top float L7 is covered. When this occurs, contact L7–1 closes thus energizing LR4 to open LR4–1 stopping the transfer pump, closing LR4–2 and LR4–3 for pilot light and emergency signals, etc. L7–2 opens to deenergize the transfer pump starter circuit. After the source of the shutdown has been determined and corrected, the emergency shutdown reset button is pressed to unlatch LR4, thus closing LR4–1 to prepare the circuits to the transfer pump starter for the next meter tank fill.

Where some situation has occurred to prevent emptying a surge tank when the normal upper level detector L12 is reached, the tank continues to fill until L13 is covered. When this occurs, L13–1 closes, thus energizing surge tank emergency high relay R12; R12–1 closes latching LR12, and the normal run cycle can start. R12–3 closes lighting emergency high pilot and provides emergency high signal. R12–2 opens stopping production from the leases. This is done by closing valves LVS–1,2 etc. These are not shown in FIGURE 1 but are in the produced fluid lines to the individual treaters.

If at any time the BS & W content of the oil reaches a predetermined maximum, relay MR1 in the BS & W monitor is energized to close MR1–1. This energizes TD3 which, after a delay, closes TD3–1. R11 is energized to close R11–2 and connect the circulating pump directly from the line H as long as MR1 is energized due to the abnormal BS & W condition. If transfer to the meter tank has not begun, when R11–3 closes this steps SS1 to the next normal position, either to another lease which is ready to deliver oil or to home. R11–4 closes to prevent the operation of TD10. Also, TD3–2 opens to prevent transfer of bad oil by deenergizing the transfer pump starter.

When the BS & W content of the oil returns to normal limits, MR1 is deenergized thus opening MR1–1, deenergizing TD3. TD3–1 opens allowing the circulating pump timer to time out and deenergizing bad oil relay R11 to close R11–1 to allow the circulating pump to be controlled by the timer. TD3–2 closes preparing to transfer oil.

Although the multi-lease programmer and the data read out system have particular utility when both are used in combination with a lease automatic custody transfer unit to provide a complete multi-lease operation having the improved read out system included therein, the multi-lease module can be used in combination with the lease automatic custody transfer unit without the improved data read out system and the improved data read out system can be used advantageously with single lease systems as well as with other types of metering systems. When it is desired to operate the system as a single lease custody transfer unit, the multi-lease programmer is disconnected and the overall circuit diagram of FIGURE 2 is simplified by removing the multi-lease programmer and making connections as indicated. The operation of the single lease system is not described in detail since it is believed to be apparent from the description of the multi-lease operation.

Other modifications within the scope of my invention will be apparent. For example, other types of temperature, gravity and BS & W measuring units may be used and the system adapted to that operation; other types of integrators, liquid level detecting and circuit completing devices, etc., may be substituted for the particular devices disclosed.

In some instances, it may not be necessary or desirable to measure and record all of the properties described in the embodiment disclosed in this application. For example, in some instances, it has been found desirable to eliminate the gravity measuring function. Jumper J–1 is used when gravity read out is not included in the operation.

Reasonable variations and modifications are possible within the scope of the foregoing disclosure, the drawing, and the appended claims to the invention, the essence of which is an improved multi-lease automatic custody transfer apparatus and method utilizing a single metering and monitoring unit, improved data read out apparatus and method, and a combination of multi-lease automatic lease custody transfer with improved data read out.

I claim:

1. A method for automatic oil field lease custody transfer which comprises producing fluid from a plurality of leases and accumulating said fluid in separate accumulation zones, automatically metering fluid from said accumulation zones separately through a single metering zone, automatically controlling communication of said accumulation zones with said metering zone to allow communication of only a single accumulation zone at one time, automatically measuring a plurality of properties of said fluid being metered and producing corresponding measured property signals, automatically converting the measured property signals to pulsed signals by passing said measured property signals through a single integrating zone, automatically controlling the passage of said measured property signals through said integrating zone to allow conversion of only a single measured property signal at one time and simultaneously controlling the passage of the pulsed signal corresponding to said single property signal to a corresponding counter.

2. A method for automatic oil field lease custody transfer which comprises producing fluid from a plurality of leases and accumulating said fluid in separate accumulation zones, automatically metering fluid from said accumulation zones separately through a single metering zone, automatically controlling communication of said accumulation zones with said metering zone to allow communication of only a single accumulation zone at one time and simultaneously controlling the passage of the pulsed signal corresponding to said single property signal to a corresponding counter, automatically measuring BS & W content, temperature, and gravity of said fluid being metered and producing corresponding measured property signals, automatically converting said property signals representing the measured BS & W content, temperature and gravity to pulsed signals by passing said property signals representing BS & W content, temperature and gravity through a single integrating zone, automatically controlling the passage of said property signals representing BS & W content, temperature and gravity through said integrating zone to permit passage of only a single signal at one time.

3. In a method for metering a fluid, the steps of automatically measuring a plurality of properties of said fluid and producing corresponding measured property signals, automatically converting said measured property signals to pulsed signals by passing said property signals through a single integrating zone, automatically controlling the passage of said property signals through said zone to allow passage of only a single property signal to said integrating zone at one time and simultaneously controlling the passage of the pulsed signal corresponding to said single property signal to a corresponding counter.

4. In a method for metering an oil field produced fluid, the steps of automatically measuring BS & W content, temperature and gravity of said fluid being metered and producing corresponding measured property signals, automatically converting said property signals representing the BS & W content, temperature and gravity to pulsed signals by passing said property signals representing BS & W content, temperature and gravity through a single integrating zone, automatically controlling the passage of said property signals representing BS & W content, temperature, and gravity through said integrating zone to permit passage of a single signal at one time therethrough and simultaneously controlling the passage of the pulsed signal corresponding to said single signal to a corresponding counter.

5. In a method for metering an oil field produced fluid, the steps of automatically measuring BS & W content, temperature and gravity of said fluid being metered and producing corresponding measured property signals, said BS & W content being determined by passing the entire stream of produced fluid through a BS & W detector at the time of metering, automatically converting said property signals representing the BS & W content, temperature and gravity to pulsed signals by passing said measured property signals representing BS & W content, temperature and gravity to a single integrating zone, automatically controlling the passage of said measured property signals representing BS & W content, temperature and gravity to said integrating zone to permit passage of a single signal at one time therethrough and simultaneously controlling the passage of the pulsed signal corresponding to said single signal to a corresponding counter.

6. Liquid transfer apparatus comprising a metering means, a transfer conduit communicating with said metering means, a first source of liquid communicating with said transfer conduit through a first control valve, a second source of liquid communicating with said transfer conduit through a second control valve, means for automatically controlling said control valves to allow flow through only one of said valves at one time, means for measuring a plurality of properties of said liquid being metered, a separate counter for each of said properties, automatic means for converting signals representing said measured properties to pulses at a rate proportional to said signals comprising a single oscillator means, means for passing said signals separately through said oscillator means and automatic means to control said means for passing signals through said oscillator to allow passage of only a single signal at one time and to direct simultaneously the pulsed signal corresponding with said single signal to the corresponding counter.

7. Means for measuring and recording a plurality of properties of a fluid being metered, comprising a separate automatic measuring means for each of said properties, a single oscillator for converting variable continuous signals to pulses at a rate proportional to said signals, a separate counter for each of said properties, automatic means for connecting each of said measuring means separately to said oscillator and simultaneously directing the pulses from said oscillator to the appropriate counter for the property being recorded.

8. Means for measuring and recording a plurality of properties of a fluid being metered including the BS & W content thereof, comprising a separate automatic measuring means for each of said properties, the measuring means for the BS & W content comprising a detector cell through which the entire stream of said fluid passes at the time of metering, a single oscillator for converting variable continuous signals to pulses at a rate proportional to said signals, a separate counter for each of said properties, automatic means for connecting each of said measuring means separately to said oscillator and simultaneously directing the pulses from said oscillator to the appropriate counter for the property being recorded.

9. Oil field lease automatic custody transfer apparatus comprising, in combination, first lease production means comprising a first surge tank, second lease production means comprising a second surge tank, a pipe line, a single metering means comprising a metering tank, automatic means to alternately fill said metering tank with fluid from one of said production means and to dump said fluid into said pipe line, first counting means to record dump cycles of said metering tank, second counting means to record said dump cycles of said metering tank, automatic means to connect said first and second surge tanks to said metering tank as necessary to transfer the fluid produced from the corresponding production means, automatic means to actuate said first counting means when fluid from said first surge tank is being metered and to actuate said second counting means when fluid from said second surge tank is being metered whereby separate records are made of the amount of fluid passed to said pipe line from each of said surge tanks, automatic means for measuring BS & W content, temperature and gravity of the fluid being metered, and for producing a separate continuously variable signal which is a function of each of these properties, a single integrator to convert said continuously variable signal into pulsed signals the frequency of the pulses of said pulsed signals being a function of said continuously variable signals, a counting means for each of said pulsed signals corresponding with each of said production means, automatic means to connect each of said continuously variable signals separately to said integrator and to connect said integrator to the one of said counters which corresponds with the property represented by said signal for the production means from which fluid is being metered.

10. In a multi-lease automatic oil field lease custody transfer apparatus, a first storage means communicating with a transfer line, a second storage means communicating with said transfer line, automatic metering means communicating with said transfer line, a transfer pump in said transfer line, a first valve controlling the outlet of said first storage means into said transfer line, a second valve controlling the outlet of said second storage means into said transfer line, disabling means actuated by each of said valves to prevent operation of said transfer pump when said valve is open, programming means for connecting one of said storage means at a time to said transfer line, and means actuated by said programming means to disable the disabling means associated with the valve of the storage means selected for transfer.

11. In a multi-lease automatic oil field lease custody transfer system, a first storage means, a second storage means, a transfer conduit, a first motor valve connecting said first storage means with said transfer conduit, a second motor valve connecting said second storage means with said transfer conduit, an electrically actuated transfer pump in said transfer conduit, a starting circuit for said pump, a first switch in said circuit actuated by said first valve to break said circuit when said valve is open, a second switch in said circuit actuated by said second valve to break said circuit when said second valve is open, a programmer for connecting said first and second storage means to said transfer line one at a time, means actuated by said programmer to shunt said first switch when said first storage means is connected and to shunt said second switch when said second storage means is connected.

References Cited in the file of this patent
UNITED STATES PATENTS

| | | |
|---|---|---|
| 2,287,786 | Diamond | June 30, 1942 |
| 2,919,435 | Hawley | Dec. 29, 1959 |
| 2,962,894 | Banks et al. | Dec. 6, 1960 |
| 2,964,944 | Kuntz | Dec. 20, 1960 |

OTHER REFERENCES

Jackson: Package LACT Unit. Oil and Gas Journal, Dec. 1, 1958 (pages 145, 146). (Copy in Scientific Library TN/860/.039.) 73–223.

Wasicek: "An Integrated Design of Lease Programming and Custody Transfer Facilities," Journal of Petroleum Technology, June 1959 (pages 16 to 19). 73–195. (Photocopy in Division 36.)